(12) United States Patent
Wool

(10) Patent No.: US 8,633,257 B2
(45) Date of Patent: Jan. 21, 2014

(54) BIO-BASED FOAM FROM NATURAL OILS

(75) Inventor: Richard P. Wool, Newark, DE (US)

(73) Assignee: Crey Bioresins, Inc., Newark, DE (US)

( * ) Notice: Subject to any disclaimer, the term of this patent is extended or adjusted under 35 U.S.C. 154(b) by 129 days.

(21) Appl. No.: 13/168,125

(22) Filed: Jun. 24, 2011

(65) Prior Publication Data

US 2012/0295993 A1 Nov. 22, 2012

Related U.S. Application Data

(60) Provisional application No. 61/488,745, filed on May 22, 2011.

(51) Int. Cl.
*C08J 9/00* (2006.01)
*C08J 9/12* (2006.01)

(52) U.S. Cl.
CPC ............... *C08J 9/0023* (2013.01); *C08J 9/122* (2013.01)
USPC ............ 521/149; 521/172; 521/178; 521/189

(58) Field of Classification Search
USPC .................................. 521/149, 172, 178, 189
See application file for complete search history.

(56) References Cited

U.S. PATENT DOCUMENTS

| | | | |
|---|---|---|---|
| 6,121,398 | A | 9/2000 | Wool et al. |
| 6,646,033 | B2 | 11/2003 | Wool et al. |
| 6,900,261 | B2 | 5/2005 | Wool et al. |
| 2004/0072976 | A1 | 4/2004 | Wool et al. |

OTHER PUBLICATIONS

Wu et al., Journal of Biobased Material and Bioenergy, Plastic Foams Based on Acrylated Epoxidized Soybean Oil, vol. 1, 417-426, 2007.*
Bonnaillie, Laetitia M., "Bio-Based Polymeric Foams from Soybean Oil and Carbon Dioxide", A dissertation submitted to the Faculty of the University of Delaware in partial fulfillment of the requirements for the degree of Doctor of Philosophy in Chemical Engineering, Fall 2007, pp. 1-255.
Bonnaillie, Laetitia M., et al., "Thermosetting Foam with a High Bio-Based Content from Acrylated Epoxidized Soybean Oil and Carbon Dioxide", Journal of Applied Polymer Science, vol. 105, 2007, pp. 1042-1052.
Andrew Guo, et al., "Rigid Polyurethane Foams Based on Soybean Oil", Journal of Applied Polymer Science, vol. 77, 2000, pp. 467-473.
Petrovic, Zoran S., "Polyurethanes from Vegetable Oils", Polymer Reviews, vol. 48, 2008, pp. 109-155.

* cited by examiner

*Primary Examiner* — Irina S Zemel
(74) *Attorney, Agent, or Firm* — McCarter & English

(57) ABSTRACT

The invention relates to foam derived from natural oils, e.g. plant and animal oils. The oils are functionalized to allow for the preparation of foams with desired chemical and physical properties, such as density and robustness. The foam may contain a triglyceride having a first set of functional groups, and a second compound or chain extender (e.g., a second triglyceride, a fatty acid or polyethylene glycol) having a second set of functional groups capable of reacting with the first set of functional groups to form a covalent bond.

26 Claims, 1 Drawing Sheet

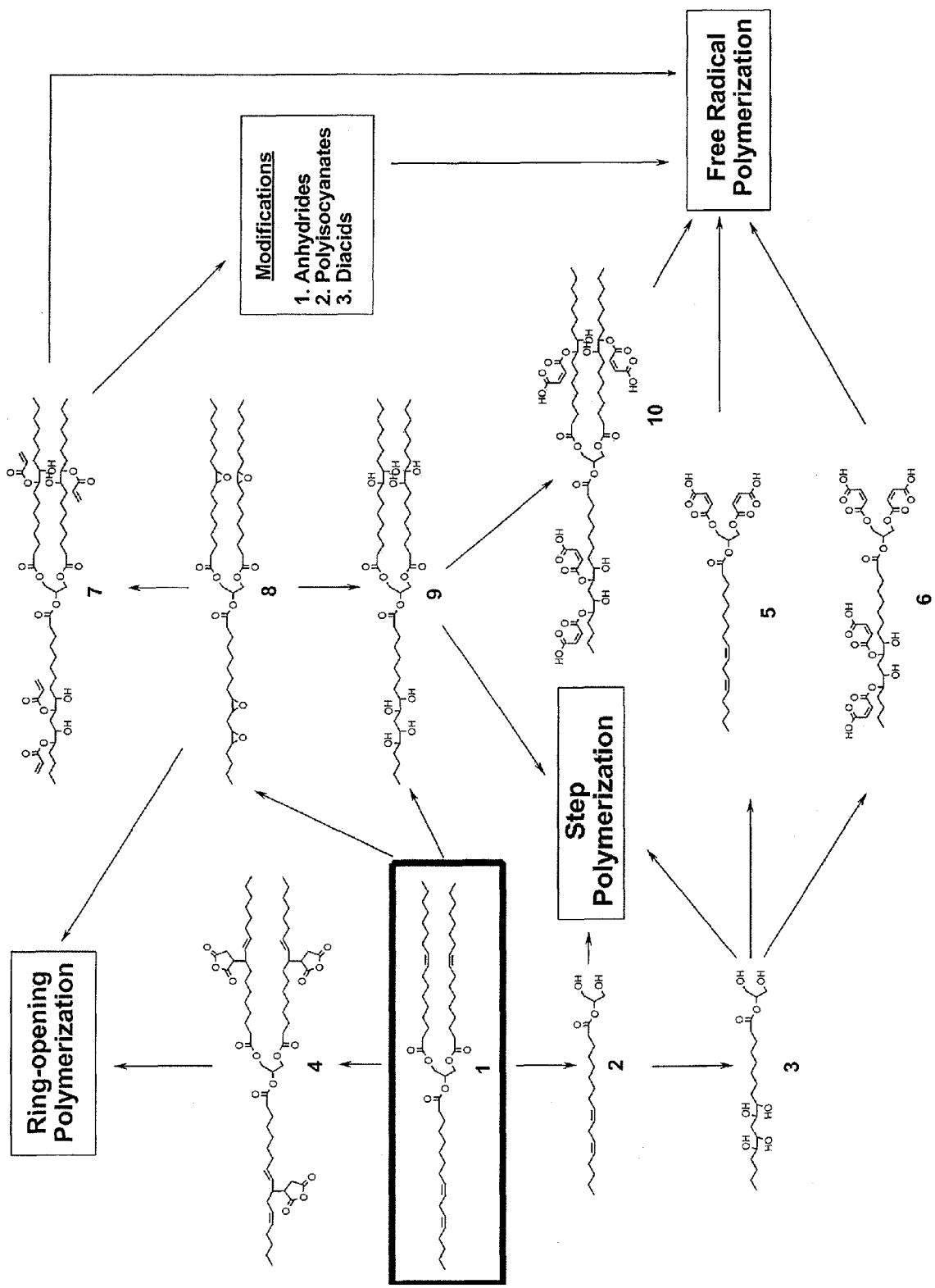

BIO-BASED FOAM FROM NATURAL OILS

CROSS REFERENCE TO RELATED APPLICATIONS

The present application claims the benefit of U.S. Provisional Application Ser. No. 61/488,745 filed May 22, 2011, the disclosure of which is expressly incorporated herein by reference in its entirety.

FIELD OF THE INVENTION

The invention relates to foam derived from natural oils. The natural oils, e.g., plant and animal oils, are functionalized to allow for the preparation of foams with desired chemical and physical properties, such as density, stiffness and robustness.

BACKGROUND OF THE INVENTION

Foams, such as polyurethanes (PUs), are abundant and play an important role as thermal and sound insulators in many industries, for example, shipbuilding, footwear, construction, cars, electronics and sporting goods. PUs are often prepared by the reaction of di-isocyanates or poly-isocyanates with polyols. PU foams may be produced, for example, by the reaction between isocyanate and water to produce a substituted urea and gaseous carbon dioxide. The carbon dioxide may function as the blowing agent in the production of the PU foam. See Klempner, D., Sendijarevi, V. et al. (2004) Handbook of polymeric foams and foam technology, Munich, Germany.

PUs can also be synthesized from components derived from vegetable oils such as soybean, palm, castor, sunflower, canola and linseed. Soybean oil is a common plant-based material used for the synthesis of polyols which are ultimately used for the production of PUs. For example, soybean oil has been used in such a manner in diverse application areas such as coating, paint formulation and foams. See Guo, A., I. Javni, et al. (2000) "Rigid polyurethane foams based on soybean oil" Journal of Applied Polymer Science 77(2): 467-473; Petrovic, Z. S. (2008) "Polyurethanes from vegetable oils" Polymer Reviews 48(1): 109-155.

The source of di-isocyanates or poly-isocyanates, however, used to prepare PU foams is predominately petroleum-based. Isocyanates are considered by the US Environmental Protection Agency (EPA) to be toxic. The EPA recently announced that di-isocyanates face EPA regulation due to adverse health effects such as breathing and skin problems and are considered by the Occupational Safety and Health Administration (OSHA) to be the leading cause of work-related asthma. See EPA (2011) "Methylene Diphenyl Di-isocyanate (MDI) and Related Compounds Action Plan"; EPA (2011) "Toluene Di-isocyanate (TDI) Action Plan". The EPA intends to target TDI and MDI by issuing a rule under the Toxic Substances Control Act (TOSCA) to require industry to notify the EPA before using TDI and MDI and their related products such as dimers, trimers and polymers. Therefore, current PU foams have considerable toxicity, regardless of being labeled "bio-based" or petroleum based. For instance, commercially available "bio-foam" may be prepared using a soyoil based polyol, but the di-isocyanate compounds (i.e., petroleum-based) are still required. This "bio-based foam", which is the current state of the art, is typically less than about 30% bio-based and still retains considerable toxicity due to the use of di-isocyanates.

Accordingly, there is a need for foams with desired chemical and physical properties, such as density and robustness, that are also predominantly bio-based and have limited or no toxicity. The foam described in the present disclosure has suitable physical and chemical properties to be applicable in a wide range of applications while also being substantially free of petroleum-based products. One of the benefits of the composition of the present disclosure is the removal of, or substantial removal of, isocyanates (e.g., di-isocyanates) from the foam. The foam described in the present disclosure is substantially, and in some embodiments completely, free of di-isocyanates, poly-isocyanates, and/or similar groups.

Similar foams made using only a single component have been reported. See Bonnaillie, L. M. and R. P. Wool (2007) "Thermosetting foam with a high bio-based content from acrylated epoxidized soybean oil and carbon dioxide" Journal of Applied Polymer Science 105(3): 1042-1052. These foams contain only acrylated epoxidized soyoil (AESO) and are characterized by densities of greater than or equal to 15 lb/ft$^3$. Light and very light foams of lesser density were not achieved by Bonnaillie, et al.

Furthermore, foams containing AESO alone tend to form defects, such as cracks, due to the incomplete reaction of the functional groups. It is well known that AESO when polymerized by itself forms elastomeric materials that tend to have a fragile consistency due to many defects existing in the resulting cross-linked structure. Bonnaillie et al. reported AESO foam having only about 64% of the acrylate groups having undergone reaction. As such, the Bonnaillie et al. foams also do not have sufficient mechanical integrity. For example, cracks were found in the Bonnaillie et al. foams which reduce the strength of the foams. For thermal insulation and many engineering and packaging applications, densities of about 1 to about 8 lb/ft$^3$ are preferred in addition to significant mechanical properties and durability. Thus, the foams described by Bonnaillie et al. are not suited to the broad range of engineering applications currently addressed by such petroleum-based foams as polyurethanes.

SUMMARY OF THE INVENTION

The present disclosure relates to a foam composition comprising a triglyceride, wherein the triglyceride is derived from a plant or animal and a chain extender, said foam obtained by foaming a mixture of the triglyceride and the chain extender; and subsequently polymerizing and/or crosslinking the foamed mixture. Preferably, the foam comprises from about 40 wt % to about 95 wt % triglyceride and about 5 wt % to about 60 wt % chain extender.

The present disclosure also relates to a process comprising (a) forming a mixture of a triglyceride having a first set of functional groups, a chain extender having a second set of functional groups capable of reacting with the first set of functional groups to form a covalent bond, and a foaming gas, wherein the triglyceride is derived from a plant or an animal, and (b) subsequently polymerizing the mixture to form a foam.

In addition, the present disclosure relates to a foam comprising a triglyceride, and a chain extender, said foam having a density between about 1 and about 15 lb/ft$^3$, and a bio-based content of greater than about 30%.

Further, the present disclosure relates to a crosslinkable foam composition comprising a triglyceride having a first set of functional groups, wherein the triglyceride is derived from a plant or an animal, a chain extender having a second set of functional groups capable of reacting with the first set of functional groups to form a covalent bond, wherein the composition is capable of forming a polymerized and/or crosslinked foam having a density between about 1 and about 15 lb/ft$^3$ and a bio-based content of greater than about 30%.

Preferably, the triglyceride has between about 3 and about 9 functional groups. Preferably, the chain extender has at least one functional group.

In yet another aspect, the present disclosure relates to a kit comprising a triglyceride having a first set of functional groups, wherein the triglyceride is derived from a plant or an animal, and a chain extender having a second set of functional groups capable of reacting with the first set of functional groups to form a covalent bond. The triglyceride and the chain extender are capable of forming a polymerized foam having a density between about 1 and about 15 lb/ft$^3$ and a bio-based content of greater than 30%.

BRIEF SUMMARY OF THE FIGURES

FIG. 1 is a diagram showing different functionalizing reactions useful for functionalizing the components of the present disclosure.

DETAILED DESCRIPTION

The disclosure relates to foam derived from natural oils. The oils may be functionalized to prepare a foam composition with desired chemical and physical properties, such as density and robustness.

As defined herein, the term "foam" refers to a substance which has gas-solid structures, consisting of a multitude of gas cells inside a solid matrix. Polymeric foams have densities ranging from 0.1 lb/ft$^3$ to 60 lb/ft$^3$. Low density foams are used for insulation and packaging, etc. High density foams are used as structural materials. Foam materials can be made by different processes and can be manufactured with desired degree of mechanical strength by varying its density.

In one embodiment, the present disclosure relates to a composition comprising a mixture of (a) functionalized triglycerides; (b) functionalized fatty acid monoglycerides, or polyethylene glycol diacrylates (PEG), etc. or combinations of each; and optionally (c) other additives such as surfactants and initiators. The composition may provide significantly improved properties over traditional materials used to make foam. For example, the mixture may be reacted by free radical polymerization in the presence of carbon dioxide gas at moderate pressure to produce a bio-based foam with superior properties suited to many different engineering applications.

The triglycerides and corresponding fatty acids are preferably derived from natural sources, such as plant and/or animal oil (See Table 1 for a listing of fatty acid distribution in various plant oils). The use of natural source components has economic and environmental advantages that make them attractive alternatives to petroleum-based materials. These materials are derived from renewable resources. They may have a very high bio-based content (up to ~90%) and, as such, a very low carbon footprint as compared to their petroleum-based counterpart. These natural source components are also non-toxic and potentially biodegradable when their useful life is over. Because the triglycerides and corresponding fatty acids can be obtained from inexpensive commodity based plant and animal oils and the necessary chemical modifications are not expensive, the new foam described herein is economically competitive with its petroleum-based equivalent material.

TABLE 1

| Fatty Acid Distribution in Various Plant Oils | | | | | | | | | |
| --- | --- | --- | --- | --- | --- | --- | --- | --- | --- |
| Fatty Acid | #C:#DB* | Canola | Corn | Cottonseed | Linseed | Olive | Palm | Rapeseed | Soybean | High Oleic** |
| Myristic | 14:0 | 0.1 | 0.1 | 0.7 | 0 | 0 | 1 | 0.1 | 0.1 | 0 |
| Myristoleic | 14:1 | 0 | 0 | 0 | 0 | 0 | 0 | 0 | 0 | 0 |
| Palmitic | 16:0 | 4.1 | 10.9 | 21.6 | 5.5 | 13.7 | 44.4 | 3 | 11 | 6.4 |
| Palmitoleic | 16:1 | 0.3 | 0.2 | 0.6 | 0 | 1.2 | 0.2 | 0.2 | 0.1 | 0.1 |
| Margaric | 17:0 | 0.1 | 0.1 | 0.1 | 0 | 0 | 0.1 | 0 | 0 | 0 |
| Margaroleic | 17:1 | 0 | 0 | 0.1 | 0 | 0 | 0 | 0 | 0 | 0 |
| Stearic | 18:0 | 1.8 | 2 | 2.6 | 3.5 | 2.5 | 4.1 | 1 | 4 | 3.1 |
| Oleic | 18:1 | 60.9 | 25.4 | 18.6 | 19.1 | 71.1 | 39.3 | 13.2 | 23.4 | 82.6 |
| Linoleic | 18:2 | 21 | 59.6 | 54.4 | 15.3 | 10 | 10 | 13.2 | 53.2 | 2.3 |
| Linolenic | 18:3 | 8.8 | 1.2 | 0.7 | 56.6 | 0.6 | 0.4 | 9 | 7.8 | 3.7 |
| Arachidic | 20:0 | 0.7 | 0.4 | 0.3 | 0 | 0.9 | 0.3 | 0.5 | 0.3 | 0.2 |
| Gadoleic | 20:1 | 1 | 0 | 0 | 0 | 0 | 0 | 9 | 0 | 0.4 |
| Eicosadienoic | 20:2 | 0 | 0 | 0 | 0 | 0 | 0 | 0.7 | 0 | 0 |
| Behenic | 22:0 | 0.3 | 0.1 | 0.2 | 0 | 0 | 0.1 | 0.5 | 0.1 | 0.3 |
| Erucic | 22:1 | 0.7 | 0 | 0 | 0 | 0 | 0 | 49.2 | 0 | 0.1 |
| Lignoceric | 24:0 | 0.2 | 0 | 0 | 0 | 0 | 0 | 1.2 | 0 | 0 |
| Functionality | | 3.9 | 4.5 | 3.9 | 6.6 | 2.8 | 1.8 | 3.8 | 4.6 | 3 |

*refers to the length of the fatty acid chain:number of double bonds;
**refers to the genetically engineered high oleic acid content soybean oil (DuPont).

In one aspect, the present disclosure relates to a composition comprising a triglyceride having a first set of functional groups, and a chain extender having a second set of functional groups capable of reacting with the first set of functional groups to form a covalent bond, wherein the reaction of the first and second set of functional groups in the presence of carbon dioxide forms a foam.

As defined herein, the term "triglyceride" refers to a derivative of glycerol in which all three available hydroxyl groups are esterified by various fatty acids, as represented by the formula:

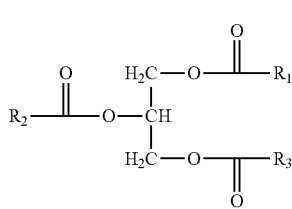

(I)

The groups R1, R2 and R3 may be independently selected various hydrocarbon chains derived from fatty acids. Preferably, the hydrocarbon chains have from between about 1 and 23 carbon atoms, more preferably from about 11 to 21 carbon atoms. The structure of typical fatty acids found in plant and animal oils are provided in Table 1. Preferably R1, R2 and/or R3 have unsaturated carbon-carbon bonds. The number of unsaturated carbon-carbon bonds in each R group may vary from 0 to 3, preferably 1 to 2. For example, the structure of a typical soyoil triglyceride of the present disclosure is shown in Formula II, wherein the level of carbon-carbon bond unsaturation is 5 per triglyceride.

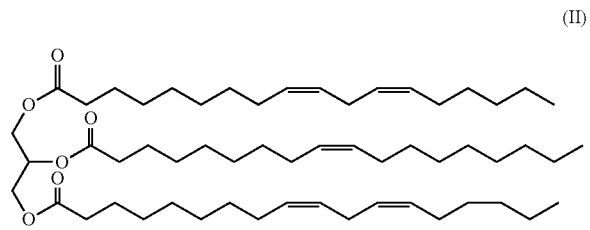

(II)

Triglycerides derived from plants and/or animals include, but are not limited to, triglycerides derived from soy oil, linseed oil, rapeseed oil, cotton oil, olive oil, corn oil, fish oil, sunflower oil, canola oil, peanut oil and palm oil. High unsaturated oils and their fatty acids are desirable for foams which need to be rigid, while low unsaturated oils and their fatty acids are desirable for foams which need to be more flexible and soft. For example, to make soft foams with low functionality, oils containing a high fraction of a fatty acid with 1 C=C per fatty acid (e.g. oleic acid) are desired. To make more rigid foams, oils containing a high fraction of a fatty acid having more than 1 C=C per fatty acid (e.g., linoleic acid, linolenic) are desired. The properties of a foam can be controlled by adjusting the number of double bonds per fatty acid through the use of mixtures of these oils and their individual fatty acids prior to functionalization.

Some examples of triglycerides that may be used in the composition of the present disclosure include, but are not limited to, AESO, CBF, and mixtures of plant oils shown in Table 1. The mixtures include soy, palm, corn, peanut, linseed, canola, olive, cotton and genetically engineered oils, such as DuPont's high oleic oil. DuPont's high oleic oil is a soyoil designed to grow with a majority of the fatty acids comprised of the oleic fatty acid with 1 C=C bond.

Also as used herein, a triglyceride of a specific fatty acid, such as conjugated linoleic acid, may contain that specific fatty acid at any or all of the three acyl group positions of the triglyceride, while the remaining acyl group positions on the triglyceride are taken up by other fatty acids. Moreover, a triglyceride of a specific fatty acid may contain any of the positional and geometric isomers of that fatty acid.

As defined herein, the term "functional group" refers to unsaturated carbon-carbon bonds that can be used for free radical or ionic polymerization. Such carbon-carbon double bonds, designated as C=C, can be derived from a variety of sources including, but are not limited to, fatty acids, acrylic acid, methacrylic acid, maleic acid and maleic anhydride. FIG. 1 shows different functionalizing reactions useful for functionalizing the components of the present disclosure. See R. P. Wool, S. H. Kusefoglu, G. R. Palmese, R. Zhao, and S. N. Khot, U.S. Pat. No. 6,121,398 (2000). In one embodiment, reacting an unsaturated bond via epoxidation, acrylation, etc., improves the formation of the foam. Without being bound to any theory, the replacement of the unsaturated bond from the hydrocarbon chain to a pendent position improves reaction mechanics.

Functional groups as used in the composition of the present disclosure may be generated by methods generally known in the art, such as epoxidation, acrylation, maleinization, amidation, or a combination of these chemical modifications. For example, the C=C double bonds of the triglycerides shown in structures 4, 7, 8, 9 and 10 of FIG. 1 can be used to functionalize the triglyceride with polymerizable chemical groups, such as maleates (4) or epoxides (8) or hydroxyl functionality (9). These reactions make the triglyceride more capable of reacting via ring opening or polycondensation polymerization. These particular chemical pathways are similar to those accessible in natural oils that contain hydroxyl groups (castor oil), epoxide groups (vernolia oil), etc. Vinyl functionality with reactive C=C groups can also be achieved with the hydroxyl and epoxide groups by reaction with, for example, acrylic acid (7) or maleic anhydride (10). These methods are not limited to triglycerides, but may also be used to functionalize the chain extender, e.g., monoglycerides, fatty acids, etc.

The total number of functional groups per triglyceride is preferably 2-9, more preferably 3-9, and most preferably 4-5. The number of functional groups in each R group may vary from 0 to 6. For soft foams, the preferred range of total functional groups is 1 to 3, and for rigid foams it is typically in the range of 3 to 9, per triglyceride.

Chain extenders, as provided below, may also be functionalized using similar reactions shown in FIG. 1. For example, individual fatty acid products having naturally occurring double bonds can be functionalized with such groups as acrylic acid and maleic anhydride to produce monomers capable of polymerizing into structures with various molecular architectures, such as linear, branched, lightly crosslinked or highly crosslinked structures. Monofunctionalized fatty acids are an important group of chain extenders which can form linear polymers and can be synthesized from the oleic fatty acid which contains one double bond, for example, by acrylation or maleinization of mono epoxidized fatty acids, or by reaction with the ester group of fully saturated fatty acids to form such monomers as methacrylated lauric acid (MLau).

A method for synthesizing monomers from triglycerides is through a glycerolysis reaction (2). Maleate half-esters can be attached to monoglycerides allowing them to free radically polymerize. In addition to the monoglycerides, the triglycerides can be reduced to their fatty acid (FA) derivatives by reacting with various alcohols such as methanol or ethanol to form the fatty acid methyl (FAME) or fatty acid ethyl ester (FAEE). FAME is a well known product called biodiesel.

As defined herein, the term "chain extender" refers to a compound having a carbon-carbon double bond(s) capable of free-radical polymerization, such as a fatty acid. In one embodiment, the fatty acid may be derived from triglycerides through chemical reactions such as alcoholysis and transesterification to form monoglycerides. The individual fatty acids may be terminally functionalized or contain several unsaturated sites which can be further functionalized with C=C bonds, similar to the triglycerides. In one embodiment, these compounds contain various levels of chemical functionality capable of reacting to form linear, branched, or crosslinked thermoset polymers when cured. Fatty acids that are monofunctionalized with a C=C group are capable of forming linear polymers. Fatty acids containing 1 to 2, or more C=C bonds are capable of forming linear, branched, lightly cross-linked and heavily cross-linked polymers. The functionalized fatty acids and related/other chain extender compounds having similar functional properties are highly desirable for blending with the triglycerides to enhance their properties in both soft and rigid materials.

The chain extender compounds that may be used in the composition of the present disclosure include, but are not limited to, triglycerides, fatty acids, polyethylene glycol acrylates, acrylic acid, methacrylic acid, maleic acid, maleic anhydride, and derivatives thereof. Preferably, the chain extender may be methacrylated lauric acid (MLau), acrylated epoxidized methyl soyate, polyethylene glycol diacrylate, iso-butyl acrylate (IBA) and ethylene diacrylate. Fatty acid monoglycerides that may be used as the chain extender compound in the composition of the present disclosure include, but are not limited to, palmitoleic, oleic, linoleic, linolenic, gadoleic and erucic fatty acids. In one embodiment, the fatty acids are derived from their parent triglyceride used in the composition. The triglycerides and fatty acids derivatives used as chain extenders typically have lower functionality than the main or parent triglyceride and may be used to adjust the functionality of the mixture to ultimately adjust the properties of the foams. The preferable proportion of triglyceride to chain extender is from 95:5 to 10:90 by weight. More preferably, the proportion of from 80:20 to 20:80.

The composition may further comprise a surfactant. As defined herein, the term "surfactant" refers to a substance which has both hydrophilic and hydrophobic groups. In one embodiment, the surfactant may be capable of stabilizing the foam structure. Surfactants that may be used in the composition of the present disclosure include, but are not limited to, alkanol surfactants, silicon-based surfactants, and siloxane-oxyalkylene copolymers. Copolymer surfactants are preferable because they can be modified for different solutions. Copolymer surfactants also work at high temperatures. Preferably, the surfactant is present in an amount between 0.05 wt % to 1.5 wt %.

The composition may further comprise an initiator. As defined herein, the term "initiator" refers to a substance that may dissociate by means of, but are not limited to, heat, microwave, ultra-violet light, to produce free radicals. In one embodiment, the initiator may be capable of starting the polymerization process. The initiator, or catalyst, may be capable of starting a reaction between different and/or the same set of functional groups. Preferably, the initiator is capable of initiating polymerization reactions of unsaturated carbon-carbon (C=C) bonds contained in the chemical functionality on the oils and their fatty acids.

Initiators that may be used in the composition of the present disclosure include, but are not limited to, dilauroyl peroxide, benzoyl peroxide, tert-butyl benzoyl peroxide, cumyl peroxide and methyl ethyl ketone peroxide. Depending on the curing temperature, some initiators are more preferable that others due to their different half-life. For example, cumyl peroxide is preferable for room temperature curing and dilauroyl peroxide is preferable for high temperature curing. Preferably, the initiator is present in an amount between 0.01 wt % to 3.0 wt %. The optimal initiator is chosen based on the available temperature ranges used during the foaming process and is well known to those skilled in the art of free radical polymerization.

The present disclosure also relates to a process for forming the foam, the process comprising foaming a mixture of a triglyceride, preferably having a first set of functional groups, and a chain extender, preferably having a second set of functional groups capable of reacting with the first set of functional groups to form a covalent bond, and a foaming gas. The triglyceride and the chain extender are preferably derived from a plant or an animal. Thereafter, the mixture is polymerized and/or crosslinked to form the foam.

The process for forming the mixture may involve mixing and/or combining the triglyceride, the crosslinking compound and a foaming gas in a pressurized vessel. The amount of foaming gas added is an amount sufficient to create gas cells in the foam to achieve the desired density. In addition, an initiator and/or a surfactant may optionally be added to the mixture prior to polymerization to form foam.

In another aspect, the process involves preparing a mixture of natural oils comprising triglycerides and their fatty acid derivatives, each of which may contain various levels of chemical functionality. The triglycerides and fatty acid derivatives are capable of reacting to form linear or cross-linked thermoset polymers when cured.

As used herein, the term "polymerizing" refers to a process that converts monomers with desirable functional groups to form a linear, branched or network structure.

In one embodiment, polymerization may be initiated by expanding the foam and then subjecting the expanded foam to thermal or microwave heating or ultra violet light, where an initiator forms free radicals to start the polymerization.

As used herein, the term "foaming gas" refers to a substance which is soluble in the disclosed mixture and may form gas bubbles in the mixture. Foaming gases that may be used in the composition of the present disclosure include, but are not limited to, nitrogen and carbon dioxide. Preferably, the foaming gas or blowing agent is carbon dioxide. The solubility of carbon dioxide in a component, e.g., AESO, increases with increasing pressure. The carbon dioxide dissolved in the mixture generates gas phase in the foam. The densities of foam can be controlled by the pressure in the system. Preferably, the pressure range of the foaming gas used is between 10 to 1000 psi. Both pressure (P) and temperature (T) affect the solubility (S) of the carbon dioxide in the mixture: high pressure increases S~T and high temperatures decrease S. High S values lead to low density foams while low S values result in high density foams.

The composition of the present disclosure may be produced by reacting one or more triglycerides with the chain extender, both suitably chemically functionalized, in the presence of carbon dioxide under various pressures with suitable heat and catalyst to form the desired foam. The reaction may involve one or more of the following reactions, free radical, ionic, anionic, cationic and/or related polymerizations to form foams of varying crosslink density. In one embodiment, the composition and/or foam may be produced by the method provided in Bonnaille et al., the entire disclosure of which is incorporated herein by reference.

In one embodiment, a high pressure vessel with maximum pressure of 3000 psi can be used to make the foam. Preferably, the vessel has inlets and outlets for the foaming gas. For example, the vessel may have an inlet connecting to a pressurized foaming gas source, such as a carbon dioxide gas cylinder, and two outlets. One outlet may be used for purge and the other may be used for sampling. The vessel may also be equipped with a stirrer. During the foaming process, the functionalized triglyceride and chain extender are added to the vessel. Optionally, an initiator and/or stabilizer (i.e. surfactant) may also be added, or charged, into the vessel. To initiate foaming, pressurized foaming gas may be added to the vessel. The foaming gas displaces or expels all or substantially all of the air from the vessel. Once the foaming gas has reached the desired pressure, the mixture may be stirred. While being stirred, the pressure may need to be adjusted until the concentration of foaming gas in the mixture reaches saturation level. The mixture may be allowed to settle for a short time (e.g., 10 min) before being allowed to expand. The mixture may be expanded by opening the valve to let the monomer expand to a mold, preferably at ambient temperature and pressure. The expanded mixture may then be cured. Curing may be achieved by microwave heating or by oven heating. Curing may also be initiated by direct contact of the pressurized mixture with a heating element just prior to depressurization, or by mixing the mixture with another, preferably colder, fluid containing the initiator. Other foaming reaction initiation methods, such as photo-initiation, may be used. These foaming configurations can be operated in either batch or continuous modes, as is well known to those skilled in the foaming art.

In another embodiment, the foam composition of the present disclosure can also be made through a different process. The process involves two different streams of reactants. For example, in stream A, the functionalized triglyceride and stabilizer can be placed under pressure, preferably in a vessel. Stream A can then be pressurized to a certain pressure, preferably at room temperature. Thereafter, high pressure carbon dioxide can be introduced into mixture. The mixture is then heated, preferably to a temperature below the thermal decomposition temperature of the initiator in stream A, while maintaining a high pressure. In stream B, the chain extender compound and initiator can be pressurized to a similar or the same pressure as stream A at room temperature. Then streams A and B may be blended, preferably in a dispenser. The turbulent flow in the dispenser mixes streams A and B into a uniform solution. The uniform solution can then be expanded to a mold in ambient pressure. The solution can then be polymerized into polymer foam.

In another embodiment, the foam composition of the present disclosure can also be made through a process involving two different streams of reactants. For example, in stream A, the functionalized triglyceride, the chain extender, and stabilizer can be placed under pressure, preferably in a vessel. Stream A can then be pressurized to a certain pressure, preferably at room temperature. Thereafter, high pressure carbon dioxide can be introduced into mixture. The mixture is then heated while maintaining a high pressure. In stream B, additional functionalized triglyceride, chain extender compound, and the initiator can be pressurized to a similar or the same pressure as stream A at room temperature. Then streams A and B may be blended, preferably in a dispenser. The turbulent flow in the dispenser mixes streams A and B into a uniform solution. The uniform solution can then be expanded to a mold in ambient pressure. The solution can then be polymerized into polymer foam.

In a further embodiment, the present disclosure also provides a kit. The kit may contain a triglyceride and a chain extender, as well as instructions and/or packaging for use. The individual components of the kit may be contained in individual compartments or packaging. For example, the present disclosure relates to a kit comprising a triglyceride having a first set of functional groups, wherein the triglyceride is derived from a plant or an animal; a chain extender having a second set of functional groups capable of reacting with the first set of functional groups to form a covalent bond; wherein the triglyceride and the chain extender are capable of forming a polymerized foam having a density between about 1 and about 15 lb/ft$^3$ and a bio-based content of greater than 30%.

The composition of the present disclosure may be characterized by different physical properties, such as open or closed cell, soft or rigid, high or low density, high or low glass transition temperature (Tg), stiffness, comprehensive modulus, compressive strength, and density. The composition can be readily converted to high performance foam by several processing techniques. The foam properties of the composition are suitable for use in a wide range of engineering applications including, but not limited to, packaging materials, thermal insulation, composites, biomedical, construction, bedding and furniture, automotive, liquid filtration, electronic and aerospace applications.

As used herein, the term "density" is the weight in air per unit volume of a foam sample, which can determined according to ASTM D1622. Preferably, the compositions of the present disclosure may have densities from about 0.1 lb/ft$^3$ to about 60 lb/ft$^3$, more preferably from about 0.4 lb/ft$^3$ to about 15 lb/ft$^3$, and even more preferably from about 1 lb/ft$^3$ to about 8 lb/ft$^3$.

In one embodiment, such as packaging materials, the foam composition of the present disclosure may have a density of about 1 lb/ft$^3$ to about 3 lb/ft$^3$, preferably of about 1 lb/ft$^3$ to about 2 lb/ft$^3$. For example, Example 12 and Example 15 have such densities.

Foams are materials with an expanded cellular structure whose density ($\rho$) is less than that of the original material ($\rho_s$). The industrial classification of foams considers super-light weight foams to have $\rho<3$ lb/ft$^3$, very light weight foams to have 3 lb/ft$^3 \leq \rho \leq 50$ lb/ft$^3$, light foams to have 20 lb/ft$^3 \leq \rho \leq 200$ lb/ft$^3$, medium density foams to have 200 lb/ft$^3 \leq \rho \leq 500$ lb/ft$^3$, heavy foams to have 500 lb/ft$^3 \leq \rho \leq 700$ lb/ft$^3$ and super-heavy foams to have $\rho>700$ lb/ft$^3$. The stiffness of the foam may be defined by its (i) Young's modulus (E) which is related to the foam density, and (ii) bulk modulus (Es) of the non foamed material via well known engineering relations of the type $E/E_s=C_2 (\rho/\rho_s)^2$ for deformations dominated by cell wall bending and $E/Es=C_3(\rho/\rho_s)$ for cell wall stretch dominated deformation.

As defined herein, the term Young's modulus (E) refers to the ratio of stress to corresponding strain when the material behaves elastically under tension. The Young's modulus of the foam composition can be measured using any suitable technique. Preferably, the foam composition provides a Young's modulus (E) of less than about 100 kPa for super-light weight foams; greater than about 100 kPa and less than about 10 MPa, preferably about 600 kPa, for light-weight foams; greater than about 600 kPa and less than about 500 MPa, preferably 10 MPa, for medium density foams, and more than about 500 MPa for super-heavy weight foams.

As defined herein, the term "bulk modulus" refers to a material's resistance to uniform compression, i.e., the pressure increase needed to cause a given relative decrease in volume. The bulk modulus of a foam composition can be measured using any suitable technique. Preferably, the foam composition has a bulk modulus of about 500 MPa to about 3 GPa. For deformation mixtures of bending and stretching, the exponents may be between 1-2. The constants $C_2$ and $C_3$ are of order unity. The compressive yield stress ($\sigma_c$) of foams is related to the density and modulus via relations of the type $\sigma_c/\sigma_y = C_4 \, (\rho/\rho_s)^{3/2}$ for yield dominated deformation and $\sigma_c = 0.05 \, (\rho/\rho_s)^2 E_s$ for cell wall buckling dominated deformation. The constant $C_4$ is of order unity and the intrinsic yield stress of the non foamed material is $\sigma_y$. Typically, the elastic modulus of the foam is found to be proportional to its compressive yield stress. The intrinsic properties of the material such as $\sigma_y$ and $E_s$ are determined by the fatty acid distribution and level of functionalization f. Generally, the relationship of these parameters is $\sigma_y \sim [f-f_c]^{1/2}$ and $E_s \sim [f-f_c]$, where $f_c$ is a critical number of double bonds per triglyceride and is of order unity.

As used herein, the term "glass transition temperature" refers to the temperature where a polymeric material changes from glassy state to rubbery state, which can be determined according to ASTM E1640 and ASTM E1356. Preferably, the compositions of the present disclosure have a glass transition temperature from −30° C. to 80° C.

As used herein, the term "compressive modulus" is the ratio of stress to corresponding strain below the proportional limit, which can be determined according to ASTM D1621, ASTM D3575, or ASTM D6576. The compositions of the present disclosure may have various compressive moduli, depending on the foam densities. Preferably, the compressive modulus of the foams of the present disclosure are about 1 to about 100,000 kPa, more preferably are about 10 to about 10,000 kPa, even more preferable about 20 to about 1,000 kPa.

As used herein, the term "compressive strength" is the stress at yield or at certain strain, which can be determined according to ASTM D1621, ASTM D3575, ASTM D6576, or other methods. The compositions of the present disclosure may have various compressive strengths, depending on the foam densities. Preferably, the compressive strength of the foams of the present disclosure are greater than about 1 kPa, more preferably are about 1 to about 10,000 kPa, even more preferable about 1 to about 300 kPa.

The use of natural oils in the composition of the present disclosure renders the composition non-toxic or substantially non-toxic because no isocyanates are necessary. The composition has a very high bio-based content as measured by ASTM D6866. Preferably, the bio-based content of the composition may range from about 30% to about 100%, more preferably about 50% to about 100%, most preferably about 75% to about 100%. In other embodiments, the bio-based content of the composition is preferably greater than about 30%, more preferably greater than about 50%, even more preferably greater than 75%, and most preferably greater than about 90%. Moreover, the composition does not contain poly or di-isocyanates, yet retains polyurethane-like foam properties.

The disclosures of all cited references are expressly incorporated herein by reference in their entirety. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

EXAMPLES

The present invention is further defined in the following Examples. It should be understood that these Examples, while indicating preferred embodiments of the invention, are given by way of illustration only. From the above discussion and these Examples, one skilled in the art can ascertain the preferred features of this invention, and without departing from the spirit and scope thereof, can make various changes and modifications of the invention to adapt it to various uses and conditions.

Example 1a

AEMO Monomer Preparation

Acrylated epoxidized methyl soyate (AEMO) monoglycerides were prepared as follows: 75 g of epoxidized methyl soyate (EMO, Vikoflex 7010™), having approximately 7% of the epoxy groups unreacted, was mixed with 27 g of acrylic acid. Then 0.75 g of AMC-2™ (AMPAC Fine Chemicals) and 0.23 g of hydroquinone were added. The mixture was heated to 90° C. and a reflux condenser was used in order to minimize the evaporation of acrylic acid. The reaction was continued for approximately 7 hour until NMR analysis showed that the desired amount of epoxy groups disappeared and the desired amount of acrylate groups appeared. This is acrylated epoxidized methyl soyate resin (AEMO). An exemplary AEMO monomer is provided below:

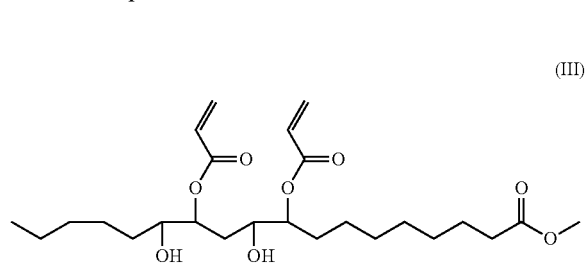

(III)

Example 1b

Bulk AEMO Monomer Preparation

On a larger scale, AEMO was made as follows: 200 g of the epoxidized methyl soyate (EMO, Vikoflex 7010™), having approximately 7% of the epoxy groups unreacted, was mixed with 2 g of AMC-2™ and 0.6 g of hydroquinone. Then 68 g of acrylic acid was added continuously. The mixture was heated to 90° C. and a reflux condenser was used in order to minimize the evaporation of acrylic acid. The reaction was continued for approximately 10 hour until NMR analysis showed that the desired amount of epoxy groups disappeared and the desired amount of acrylate groups appeared.

Example 2

AESO Preparation

AESO was made as follows: 200 g of the epoxidized soybean oil (ESO, Vikoflex 7170™), having approximately 7% of the epoxy groups unreacted, was mixed with 2 g of AMC-2™ and 0.6 g of hydroquinone. Then 68 g of acrylic acid was added continuously. The mixture was heated to 70° C. and a reflux condenser was used in order to minimize the evaporation of acrylic acid. The reaction was continued for approximately 10 hour until NMR analysis showed that the desired amount of epoxy groups disappeared and the desired amount of acrylate groups appeared. An exemplary AESO monomer is provided below:

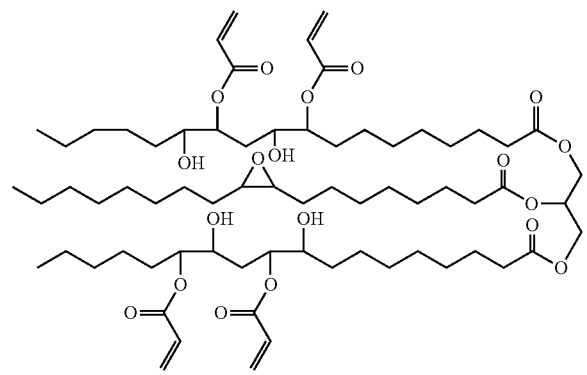

(IV)

Example 3

Foam Comprising AESO and MLAU (50 wt %/50 wt %)

A foam was prepared by mixing 56 g of acrylated epoxidized soybean oil resin with 56 g of methacrylated lauric acid (MLau, Dixie Chemicals). Then 0.15 g of silicone surfactant and 0.56 g of dilauroyl peroxide (Arkema PD-1104™) were added to the mixture. The mixture was transferred to a high pressure vessel and purged with carbon dioxide, after which carbon dioxide with a pressure of 800 psi was dissolved into the mixture, while the mixture was stirred vigorously for 30 min. The mixture was allowed to settle for 10 min afterward. Then the mixture was expanded to ambient pressure to give homogenous foamed liquid. The liquid was heated in a 700 W microwave oven for 90 s to give a cured thermoset foam. The foam was white and soft. The density, compressive strength, and compressive modulus of the foam were measured according to ASTM methods for all examples. The properties of the foam are summarized in Table 2.

TABLE 2

| | Bio-based Foams from Soybean Oil Resins | | | | | |
|---|---|---|---|---|---|---|
| Ex. | Triglyceride wt % | Other wt % | Surfactant phr* | Initiator** phr | Density lb/ft$^3$ | Strength kPa | Modulus kPa |
| 3 | AESO, 50 | MLau, 50 | 0.25 | 0.5 | 12.5 | 11.8 | 65.8 |
| 4 | AESO, 50 | AEMO, 50 | 0.15 | 0.5 | 8.7 | 4.2 | 22.4 |
| 5 | AESO, 70 | AEMO, 30 | 0.1 | 0.5 | 10.6 | 9.2 | 51.5 |
| 6 | AESO, 70 | AEMO, 30 | 0.25 | 0.5*** | 9.4 | 22.4 | 106 |
| 7 | AESO, 70 | MLau, 30 | 0.1 | 0.5 | 7.5 | 7.2 | 37.7 |
| 8 | AESO, 85 | MLau, 15 | 0.1 | 0.5 | 6.9 | 7.6 | 40.0 |
| 9 | AESO, 85 | AEMO, 15 | 0.3 | 0.5 | 6.2 | 5.8 | 27.2 |
| 10 | CBF, 65 | PEG400, 17.5 IBA, 17.5 | 0.1 | 1 | 4.4 | 5.5 | |
| 11 | CBF, 74 | PEG200, 13; IBA, 13 | 0.1 | 1 | 0.4 | 0.34 | |
| 12 | CBF, 74 | PEG1000, 13; IBA, 13 | 0.1 | 1 | 1.5 | 1.2 | |
| 13 | AESO, 90 | PEG400, 5; IBA, 5 | 0.1 | 1 | 5.8 | 11.7 | |
| 14 | AESO, 74 | PEG400, 13; IBA, 13 | 0.1 | 1 | 3.3 | 2.3 | |
| 15 | AESO, 74 | PEG1000, 13; IBA, 13 | 0.1 | 1 | 2.2 | 2.1 | |

*phr: part per hundred resin;
**Initiator is dilauroyl peroxide, except Example 6;
***the initiator is Luperox P (Arkema)

Example 4

Foam Comprising AESO and AEMO (50 wt %/50 wt %)

A foam was prepared by mixing 77 g of acrylated epoxidized soybean oil resin with 77 g of acrylated epoxidized methyl soyate resin. Then 0.12 g of silicone surfactant and 0.35 g of dilauroyl peroxide were added to the mixture. The mixture was transferred to a high pressure vessel and purged with carbon dioxide, after which carbon dioxide with a pressure of 800 psi was dissolved in the mixture, while it was stirred vigorously for 30 min. The mixture was allowed to settle for 10 min afterward. Then the mixture was expanded to ambient pressure to give homogenous foamed liquid. The liquid was heated in a 700 W microwave oven for 90 s to give a cured thermoset foam. The foam was white and soft. The properties of the foam are summarized in Table 2.

Example 5

Foam Comprising AESO and AEMO (70 wt %/30 wt %)

A foam was prepared by mixing 63 g of acrylated epoxidized soybean oil resin with 28 g of acrylated epoxidized methyl soyate resin. Then 0.09 g of silicone surfactant and 0.45 g of dilauroyl peroxide were added to the mixture. The mixture was transferred to a high pressure vessel and purged with carbon dioxide, after which carbon dioxide with a pressure of 800 psi was dissolved in the mixture, while it was stirred vigorously for 30 min. The mixture was allowed to settle for 10 min afterward. Then the mixture was expanded to ambient pressure to give homogenous foamed liquid. The liquid was heated in a 700 W microwave oven for 90 s to give a cured thermoset foam. The foam was white and soft. The properties of the foam are summarized in Table 2.

Example 6

Foam Comprising AESO and AEMO (70 wt %/30 wt %)

A foam was prepared by mixing 41 g of acrylated epoxidized soybean oil resin with 17 g of acrylated epoxidized methyl soyate resin. Then 0.15 g of silicone surfactant and 0.3 g of Luperox P™ was added to the mixture. The mixture was transferred to a high pressure vessel and purged with carbon dioxide, after which carbon dioxide with a pressure of 800 psi was dissolved in the mixture, while it was stirred vigorously for 30 min. The mixture was allowed to settle for 10 min afterward. Then the mixture was expanded to ambient pressure to give homogenous foamed liquid. The liquid was heated in a 700 W microwave oven for 100 s to give a cured thermoset foam. The foam was white and soft. The properties of the foam are summarized in Table 2.

Example 7

Foam Comprising AESO and MLAU (70 wt %/30 wt %)

A foam was prepared by mixing 51 g of acrylated epoxidized soybean oil resin with 22 g of methacrylated lauric acid. Then 0.08 g of silicone surfactant and 0.38 g of dilauroyl peroxide were added to the mixture. The mixture was transferred to a high pressure vessel and purged with carbon dioxide, after which carbon dioxide with a pressure of 725 psi was dissolved in the mixture, while it was stirred vigorously for 30 min. The mixture was allowed to settle for 10 min afterward. Then the mixture was expanded to ambient pressure to give homogenous foamed liquid. The liquid was heated in a 700 W microwave oven for 80 s to give a cured thermoset foam. The foam was white and soft. The properties of the foam are summarized in Table 2.

Example 8

Foam Comprising AESO and MLAU (85 wt %/15 wt %)

A foam was prepared by mixing 57 g of acrylated epoxidized soybean oil resin with 10 g of methacrylated lauric acid. Then 0.07 g of silicone surfactant and 0.33 g of dilauroyl peroxide were added to the mixture. The mixture was transferred to a high pressure vessel and purged with carbon dioxide, after which carbon dioxide with a pressure of 725 psi was dissolved in the mixture, while it was stirred vigorously for 30 min. The mixture was allowed to settle for 10 min afterward. Then the mixture was expanded to ambient pressure to give homogenous foamed liquid. The liquid was heated in a 700 W microwave oven for 75 s to give a cured thermoset foam. The foam was white and soft. The properties of the foam are summarized in Table 2.

Example 9

Foam Comprising AESO and MLAU (85 wt %/15 wt %)

A foam was prepared by mixing 53 g of acrylated epoxidized soybean oil resin with 9.4 g of methacrylated lauric acid. Then 0.19 g of silicone surfactant and 0.31 g of dilauroyl peroxide were added to the mixture. The mixture was transferred to a high pressure vessel and purged with carbon dioxide, after which carbon dioxide with a pressure of 725 psi was dissolved in the mixture, while it was stirred vigorously for 30 min. The mixture was allowed to settle for 10 min afterward. Then the mixture was expanded to ambient pressure to give homogenous foamed liquid. The liquid was heated in a 700 W microwave oven for 95 s to give a cured thermoset foam. The foam was white and soft. The properties of the foam are summarized in Table 2.

Example 10a

CBF Preparation

AESO is commercially available. CBF is a non-commercial AESO with 3.2 acrylate groups per triglyceride. It is made by epoxidation of mixtures of soyoil and linseed oil followed by acrylation.

Example 10b

Foam Comprising CBF and PEG 400

A foam was prepared by mixing 65 wt % CBF, 17.5 wt % PEG400 diacrylate (available from Sartomar) and 17.5 wt % Isobutyl acrylate (IBA). IBA is a component with only one functional group. PEG 400 DA is a diacrylate of polyethylene glycol with a molecular weight of 400 daltons. The mixture was combined with 1% PD-1104 and 0.1% silicone surfactant. Carbon dioxide was infused at 500 psi for 30 min and the foam extruded and cured by microwave. The resulting foam had a density of 4.4 lb/ft³ and a peak compressive strength of 0.8 psi. The foam was white and soft with a closed cell microstructure. The properties of the foam are summarized in Table 2.

Example 11

Foam Comprising CBF and PEG 200

A foam was prepared by mixing 74 wt % CBF, 13 wt % PEG 200 diacryalte and 13 wt % IBA. The mixture was combined with 1% PD-1104™ and 0.1% silicone surfactant. Carbon dioxide was infused at 500 psi for 30 min and the foam extruded and cured by microwave. The resulting foam had a density of 0.4 lb/ft³ and a peak compressive strength of 0.05 psi. The foam was white and soft with a closed cell microstructure. The properties of the foam are summarized in Table 2.

Example 12

Foam Comprising CBF and PEG 1000

A foam was prepared by mixing 74 wt % CBF, 13 wt % PEG 1000 diacrylate and 13 wt % IBA. The mixture was combined with 1% PD-1104™ and 0.1% silicone surfactant. Carbon dioxide was infused at 500 psi for 30 min and the foam extruded and cured by microwave. The resulting foam had a density of 1.46 lb/ft³ and a peak compressive strength of 0.18 psi. The foam was white, very soft and had a combination of open and closed cell microstructure. The properties of the foam are summarized in Table 2.

Example 13

Foam Comprising AESO and PEG400

A foam was prepared by mixing 90 wt % AESO with 5 wt % PEG400 diacrylate and 5 wt % IBA. To this mixture was added 1 wt % initiator and 0.1 wt % surfactant. Carbon dioxide was infused at 500 psi for 20 min. The extruded foam was cured in a cylindrical contained by microwave. The resulting foam density was 5.8 lb/ft³ with a peak compressive strength of 1.7 psi. The foam was white in appearance, a little stiff to the touch but softer than Example 16 and was largely closed cell structure. The properties of the foam are summarized in Table 2.

Example 14

Foam Comprising AESO, IBA, and PEG400

A foam was prepared by mixing 74 wt % AESO with 13 wt % PEG400 diacrylate and 13 wt % IBA. To this mixture was added 1 wt % initiator and 0.1 wt % silicone surfactant. Carbon dioxide was infused at 500 psi for 20 min. The extruded foam was cured by microwave in a cylindrical container. The resulting foam density was 3.3 lb/ft³ with a peak compressive strength of 0.34 psi. The foam was white in appearance, soft to the touch and was largely open cell structure. The properties of the foam are summarized in Table 2.

Example 15

Foam Comprising AESO, IBA, and PEG 1000

A foam was prepared by mixing 74 wt % AESO with 13 wt % PEG1000 diacrylate and 13 wt % IBA. To this mixture was added 1 wt % initiator and 0.1 wt % silicone surfactant. Carbon dioxide was infused at 500 psi for 20 min. The extruded foam was cured by microwave in a cylindrical container. The resulting foam density was 2.15 lb/ft³ with a peak compressive strength of 0.31 psi. The foam was white in appearance, soft to the touch and was largely open cell structure. The properties of the foam are summarized in Table 2.

Example 16

MAESO Preparation 50 g of AESO prepared in Example was mixed with 1 g of N,N-dimethylbenzylamine and 0.05 g of hydroquinone. The mixture was heated to 80-90° C. and 8.2 g of maleic anhydride was added continuously. The reaction was continued for 1-3 hour to form a viscous fluid. This resulting viscous fluid is maleinated acrylated epoxidized soybean oil (MAESO).

I claim:

1. A foam comprising
   a triglyceride, wherein the triglyceride is derived from a plant or animal, and
   a chain extender, wherein the chain extender is a monoglyceride or a fatty acid,
   said foam obtained by foaming a mixture of the triglyceride and the chain extender to form a foamed mixture; and subsequently polymerizing the foamed mixture to form the foam.

2. The foam of claim 1, wherein the triglyceride has the formula (I)

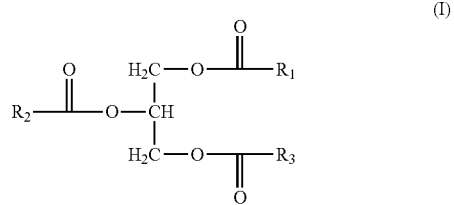

where $R_1$, $R_2$ and $R_3$ are independently selected from the group consisting of a hydrocarbon chain derived from a fatty acid having from between about 1 and 23 carbon atoms.

3. The foam of claim 1, wherein the triglyceride is derived from soybean oil.

4. The foam of claim 1, wherein the weight ratio of triglyceride to chain extender ranges from 10:90 to 90:10.

5. The foam of claim 1, wherein the triglyceride is functionalized with functional groups selected from the group consisting of acrylic acid, methacrylic acid, maleic acid and maleic anhydride.

6. The foam of claim 1, wherein the foam has a density between about 1 and 15 lb/ft³.

7. The foam of claim 1, further comprising a surfactant.

8. The foam of claim 1, further comprising an initiator.

9. The foam of claim 1, wherein the foam is substantially free of di-isocyanate and poly-isocyanate groups.

10. The foam of claim 1, wherein the foam has a bio-based content of greater than 30%.

11. A process comprising
    (a) forming a mixture of a triglyceride having a first set of functional groups, a chain extender having a second set of functional groups capable of reacting with the first set of functional groups to form a covalent bond, and a foaming gas, wherein the triglyceride is derived from a plant or an animal, wherein the chain extender is a monoglyceride or a fatty acid, and (b) subsequently polymerizing the mixture to form a foam.

12. The process of claim 11, wherein the mixture further comprises an initiator.

13. The process of claim 11, wherein the mixture further comprises a surfactant.

14. The process of claim 11, wherein the foam has a density between about 1 and about 15 lb/ft$^3$.

15. The process of claim 11, wherein the foam has a bio-based content of greater than 75%.

16. The process of claim 11, wherein the mixture is polymerized by thermal or microwave heating, or ultra-violet light.

17. A foam comprising
a triglyceride, and
a chain extender, wherein the chain extender is a monoglyceride or a fatty acid,
said foam having a density between about 1 and about 15 lb/ft$^3$, and a bio-based content of greater than 30%.

18. A crosslinkable foam composition comprising
a triglyceride having a first set of functional groups, wherein the triglyceride is derived from a plant or an animal;
a chain extender having a second set of functional groups capable of reacting with the first set of functional groups to form a covalent bond, wherein the chain extender is a monoglyceride or a fatty acid;
wherein the composition is capable of forming a polymerized foam having a density between about 1 and about 15 lb/ft$^3$ and a bio-based content of greater than 30%.

19. The foam of claim 1, wherein the foam has a glass transition temperature from −30° C. to 80° C.

20. The process of claim 11, wherein the foaming gas is carbon dioxide.

21. The foam of claim 17, wherein the foam has a glass transition temperature from −30° C. to 80° C.

22. The foam composition of claim 18, wherein the foam has a glass transition temperature from −30° C. to 80° C.

23. The foam of claim 1, wherein the fatty acid is monofunctionalized with a C═C group.

24. The foam of claim 1, wherein the fatty acid is selected from the group consisting of MLau, myristoleic acid, palmitoleic acid, margaroleic acid, oleic acid, gadoleic acid and erucic acid.

25. The foam of claim 1, wherein both the triglyceride and the chain extender are derived from natural sources.

26. The foam of claim 1, wherein the chain extender is a monoglyceride wherein the fatty acid portion of the monoglyceride is monofunctionalized with a C═C group.

* * * * *